Jan. 15, 1963   E. C. HUNGATE   3,073,095
APPARATUS FOR TREATING AIR
Original Filed April 2, 1956

INVENTOR.
ERNEST C. HUNGATE.
BY
ATTORNEY.

3,073,095
APPARATUS FOR TREATING AIR

Ernest C. Hungate, Liverpool, N.Y., assignor to Carrier Corporation, Syracuse, N.Y., a corporation of Delaware
Original application Apr. 2, 1956, Ser. No. 575,560, now Patent No. 2,932,360, dated Apr. 12, 1960. Divided and this application Jan. 28, 1960, Ser. No. 5,221
8 Claims. (Cl. 55—230)

This application is a division of my copending application, Serial No. 575,560, filed April 2, 1956, now Patent No. 2,932,360, issued April 12, 1960, entitled apparatus for treating air, and relates to an apparatus for treating air of the type generally used in air conditioning and air washing systems in which the air stream is placed in direct contact with water by discharge of water into the air stream as it moves through the apparatus.

Heretofore, apparatus for treating air with water as generally utilized in industrial applications have been severely restricted in operating velocities due to the configuration of the eliminators employed in the apparatus. Eliminators are normally used to remove entrained water particles from the air stream before its discharge from the apparatus. The eliminators usually employed consist of a plurality of stationary blades having a general saw-tooth cross-section which provide zig-zag paths through the eliminators. These eliminators are not effective at velocities below or above a certain critical range. In textile applications, for example, the problem is further aggravated by the presence of lint in the air stream. Lint in the air stream passing through the apparatus is moistened and clings to the surface of the eliminators requiring frequent removal and cleaning of the eliminators.

The chief object of the present invention is to provide a versatile apparatus for treating air over a wide range of air velocities including high air velocities.

An object of the present invention is to provide a self-cleaning apparatus for treating air which will remove lint and dirt particles from the air stream.

A further object is to provide a rotating eliminator which will satisfactorily remove liquid and foreign particles from a high velocity gas stream.

A still further object is to provide an eliminator that is self-cleaning. Other objects of the invention will be readily perceived from the following description.

This invention relates to an apparatus for treating air comprising a first cylinder, a second cylinder concentrically disposed within the first cylinder, the first cylinder being closed at one end, the cylinder disposition creating an annular air intake and a circular discharge opening, a fan disposed in the second cylinder adapted to pass air through the air intake and out the discharge opening, a rotatable hub having a plurality of orifices therein, means for supplying water to the hub, a plurality of blades extending radially from the hub, the hub and blade structure being located adjacent an end of the second cylinder and within the first cylinder, at least one ring disposed about the hub and blades for water issuing from the orifices to impinge against to form a spray of finely divided water particles in the air stream passing through the apparatus.

Further this invention relates to an apparatus for treating air comprising a casing, means for passing a gas stream through the casing, spray means including at least one ring, a plurality of rotating orifices concentrically disposed within the ring, the orifices being adapted to radially expel streams of water by centrifugal force, the streams of water impinging against the ring thereby breaking up the stream into finely divided particles and an eliminator for removing water particles entrained in the gas stream prior to discharge from the casing, the eliminator being rotatably mounted in the casing and including a hub and a plurality of blades mounted on the hub and extending radially therefrom.

Figure 1:
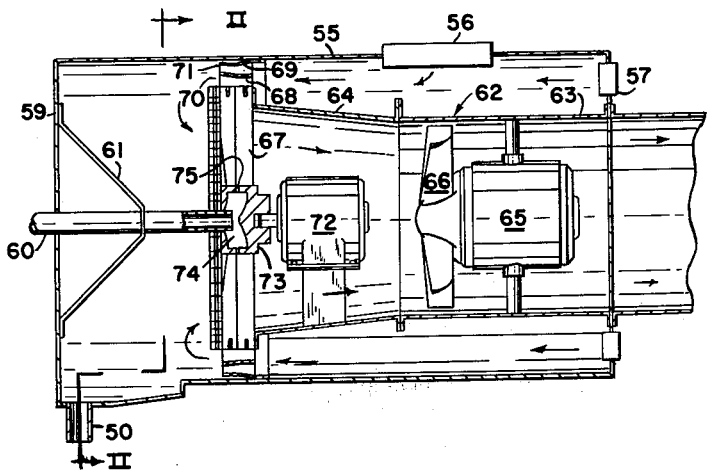
FIGURE 1 is a sectional view of a form of the invention providing impingement means for breaking up the discharged water stream.

In FIGURE 1 there is illustrated an embodiment of the present invention. The apparatus shown in FIGURE 1 includes a cylindrical casing 55 having an outside air inlet 56 and return air inlets 57. Modulating dampers (not shown) regulate the proportions of return and outside air introduced into the apparatus. One end of casing 55 is closed by end wall 59. The casing 55 is provided with a drain 50 from which water and foreign particles in the air stream may be drained from the system.

A casing 62 comprising a cylindrical section 63 and a conical section 64 extends concentrically in the casing 55. Located within the cylindrical section 63 is a fan 65 having suitable blades 66 for inducing an air stream through the annular space between the inner and outer casings 55 and 62. Adjacent the inlet to the conical section 64, there is located an eliminator 67. The rings 68 and 69 are concentrically disposed about the eliminator 67 and are firmly attached to the casings 55 and 62. These rings may comprise a plurality of angularly disposed teeth 70 and 71, the purpose of which will be described hereinafter. The eliminator 67 includes a hub 73 which is actuated by the motor 72. The hub 73 contains a hollow cavity 74 from which extend a plurality of angularly disposed orifices 75. A water line 60 extends through end wall 59 of the casing 55 and is connected to the hub 73 of the eliminator 67. Water is supplied to the cavity 74 through the line 60. The conical surface 64 of the casing 62 is preferably concentrically located within the casing 55.

Figure 2:
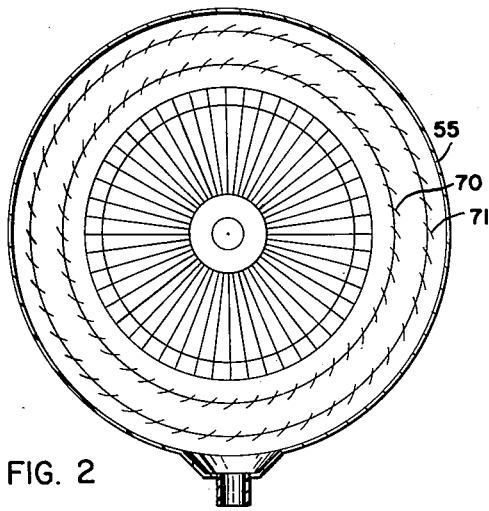
FIGURE 2 is a sectional view of the apparatus shown in FIGURE 1 taken along the line II—II.

In FIGURE 2 I have illustrated a section of the apparatus shown in FIGURE 1 taken along the line II—II, which further indicates the nature of the hub and the blade configuration of the eliminator and also the orientation of the teeth 70 and 71 on the rings 68 and 69.

Figure 3:
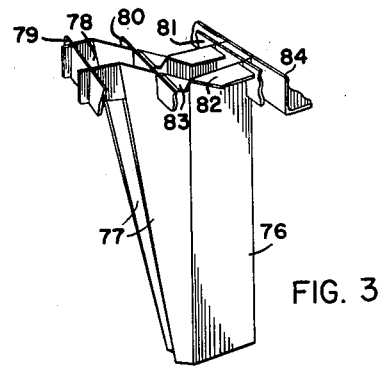
FIGURE 3 is a fragmentary view of the blade structure employed in the apparatus shown in FIGURE 1.

FIGURE 3 shows a fragmentary view of the eliminator 67 essentially indicating the blade structure. The blades comprise a first planar member 76 and a second planar member 77 which are angularly disposed and intersect at a line which radially extends from the hub 73. Extending from the member 77 is a tab 78. In order to reinforce this eliminator structure and to enclose the air path, three parallel rings 79, 80, and 81, are concentrically located about the periphery of the eliminator. At the periphery of the eliminator there extend from the members 76 and 77 tabs 82 and 83, which are planar protuberances, the purpose of which is to provide enclosing means at least partially enclosing the periphery of the eliminator. FIGURE 3 also shows a flange 84 which extends from the conical section 64 of the casing 62. This flange co-acting with the outer edge of the member 76 provides a seal which prevents the flow of air out of the unit without passing through the eliminator structure.

Apparatus of the type described basically may carry out a heat transfer process which will result in the humidification or the dehumidification of the air stream depending upon the relative conditions of the air stream and water utilized. This process may be accompanied by an air cleaning process in which the water moistens particles in the air stream causing them to pass out of the drain of the apparatus.

To effectively humidify or dehumidify an air stream by placing water in direct contact with the air stream it is necessary that the water be broken up into very many finely divided particles or droplets, thus providing adequate surface area between the air and the water discharged therein to facilitate evaporation of the water spray or the condensation of moisture from the air by a rapid transfer of heat from one to the other. The rate of heat transfer may be increased by reducing the resistance of the film co-efficient of the surface of the droplets so that under some circumstances recirculation or turbulence of the air stream may be provided. The problem of effectively removing particles or droplets of water entrained in the air stream after the heat transfer process is critical.

As previously mentioned it is common practice to employ stationary eliminator plates in an attempt to remove entrained droplets from the air stream; as previously disclosed these stationary plates provide a plurality of zig-zag paths through which the water laden air stream flows. As the laden air stream passes along these paths, the continual change in direction causes the water to impinge upon the various surfaces of the many plates, at least some of the water droplets collecting thereon and being removed from the air stream. This water drains from the eliminator by gravity into a suitable collecting means located beneath the eliminator plates.

Because of the stationary nature of this type of eliminator the velocity with which the air stream passes through the eliminator and consequently through the apparatus, is very critical so that the range of operating velocities available is very limited. Velocities above this narrow range will result in discharge from the apparatus of treated air carrying entrained water particles. Velocities below this critical range do not cause sufficient impingement and therefore permit the water to carry through the eliminator structure. In either case the operation is wholly unsatisfactory. Since many of these units are used in textile mills the undesirability of water droplets falling upon the equipment and material being processed will be readily appreciated.

In operation, air is drawn in suitable proportions as determined by the control system for the modulating dampers of the inlets 56 and 57. The air enters into the annular space between the casings 55 and 62 and is drawn towards the closed end 59 by the fan 65. As the air passes into the vicinity of the rings 68 and 69 it is put in direct contact with a spray of water. The air passes by the rings and changes direction 180° passing into the eliminator structure 67. Simultaneously, water is supplied from the line 60 into the hollow cavity 74 of the hub 73. Since the motor 72 is rotating the hub and eliminator structure, the water entering the hollow cavity 74 is centrifugally forced towards the outer extremities of the hollow cavity. The water passes radially through the orifices 75, through the eliminator structure, and impinges against the teeth 70 and 71 of the ring 68 and 69. Upon impact with these teeth, the water is broken up into many very finely divided particles. At this point the water spray is placed in physical contact with the air stream originating from the openings 56 and 57. The air is either humidified or dehumidified depending upon the relationship of the entering air dew point with respect to the spray water temperature. The air discharged from the apparatus is at a desired temperature and desired dew point. It will be appreciated that the absolute humidity of the air leaving the unit may be less than the incoming air because of the physical fact that the ability of the air to retain moisture decreases as its temperature drops. Therefore heat transfer between chilled water, for example, discharged into the air stream may result in the precipitation of water from the air since the decrease in temperature will result in a decrease in the capacity of the air to retain the moisture.

It will be readily perceived that humidification may also occur; in such case the temperature of the incoming air and the spray water will cause part of the spray water to evaporate, adding to the air moisture content and increasing its humidity.

Passage of the air stream through the water sprays entrains particles of water. In prior equipment, the velocity with which the air stream left the equipment was critical due to the manner in which the stationary eliminators functioned to remove entrained water particles in the air stream and their dependence upon gravity to carry the water from the eliminator surfaces after the water had impinged thereon. In the present invention a novel eliminator of a rotating type is provided in which the entrained water particles impinge upon a plurality of rotating blades as the air stream is discharged from the apparatus. Blades remove the droplets from the air stream and return the water to the apparatus.

The theory of operation of a rotating eliminator primarily resides in an impingement process. Air is induced axially into the rotating blade structure which comprises the eliminator. This air may be in a near saturated condition and include water particles entrained in the air stream. As the air enters the zone in which the rotating blades travel, the particles of water in the air change direction and impinge against the rotating blade structure. The water collects upon the surface of the blades and because of the rotation of the blades, tend to be expelled outwardly due to centrifugal action.

It is appreciated that the air and water will be subject to the influence of centrifugal force and also the forces driving the air stream through the apparatus and axially through the eliminators.

To assist the blades in their eliminating action, means are provided which will at least partially enclose the periphery of the eliminator. With such a construction the air under the partial influence of centrifugal force may create a high pressure area about the periphery of the eliminator beneath the enclosing means. This pressure is relieved by the passage of air axially through the blades. Water particles however are forced outwardly and are permitted to collect temporarily at the enclosing means and then returned to the apparatus.

The tabs 78 on the eliminator blades at this point create a recirculating effect and pass a portion of the air in the cavity adjacent to the end wall 59 back into the moistening section adjacent the teeth 70 and 71. The remainder of the air passes through the eliminator structure and out of the system through the casing 62. Excess water is drained from the system through the drain opening 50.

There has been presented a modification of the invention as utilized in an air conditioning system. However it will be apparent that this type system may be utilized merely for its air washing capabilities.

Furthermore, it is apparent that the eliminator structure can be used in applications wherein it is desired to remove liquid particles from a gas stream passing through the eliminator structure. It is also noted that the particular type apparatus disclosed with its rotating eliminators are highly commended for air and gas washing operations in which a liquid would be utilized to wash the gas stream and the eliminator would remove liquid particles from the gas stream as it leaves the apparatus and pass the liquid containing foreign particles back into the apparatus.

A characteristic of this rotating eliminator which is of particular interest is its tendency to be self-cleaning. Because of its rotational nature, forces may be exerted on the liquid particles many times greater than the gravitational action relied on in stationary eliminators so that the water and dirt particles will always be subject to centrifugal forces many times greater than any adhesive forces thereby insuring clean eliminator blades. An application for this type of apparatus with its eliminator exists in textile mills wherein not only is the air humidified but also it is cleaned by the washing action of the water. In stationary eliminators, the wet lint coats the eliminator surfaces requiring frequent and extensive maintenance. It has been found that this rotating eliminator structure is sufficiently effective to maintain itself free from wet lint.

While I have described only one embodiment of the invention it will be understood the invention is not limited thereto since it may be otherwise embodied within the scope of the following claims.

I claim:

1. An apparatus for treating air comprising a first cylinder, a second cylinder concentrically disposed within the first cylinder, said first cylinder being closed at one end, said cylinder disposition creating an annular air intake and a circular discharge opening, a fan disposed in said second cylinder adapted to move air through said air intake and out the discharge opening, a rotatable hub having a plurality of orifices therein, means for supplying water to said hub, a plurality of blades extending radially from the hub, adjacent blades being spaced in overlapping relationship to define a plurality of axial paths having at least one change in direction, said hub and blade structure being located adjacent an end of the second cylinder and within the first cylinder, at least one ring disposed about said hub and blade structure, said ring having means thereon for water issuing from said orifices to impinge against to form a spray of finely divided water particles in the air stream passing through the apparatus.

2. In an apparatus for treating air, the combination of a first casing, a second casing concentrically placed within the first casing, said first casing being closed at one end, said second casing being spaced from said closed end and from said first casing to define an annular intake opening between said casings, said second casing having a discharge opening, fan means disposed in said second casing for moving air through said intake opening and out said discharge opening, a rotatable hub having a plurality of orifices therein, means for supplying water to said hub, a plurality of blades extending radially from said hub, said hub and said blades located adjacent an end of the second casing and within said first casing, at least one ring disposed about said hub and said blades for water issuing from said orifices to impinge against to form a spray of finely divided water particles in the air stream passing through the apparatus, each of said blades having at least a first planar member extending substantially from the axis of rotation, and a second planar member extending substanitally from the axis of rotation, said members intersecting in a line drawn substantially radially of the axis of rotation, said blades defining a plurality of axial paths, each having a change in direction, and means on said blades for at least partially enclosing the periphery of said blades, said blades substantially removing water particles entrained in the air stream prior to discharge from the second casing.

3. An apparatus as in claim 2 wherein the means partially enclosing the periphery of said blades comprise tabs extending from the planar members at an angle relative thereto and rings concentrically disposed about the blades adjacent the peripheries thereof.

4. In an apparatus for treating air, the combination of a first casing, a second casing concentrically mounted within the first casing, said first casing being closed at one end, said casing disposition creating an annular air intake, one end of said second casing being in communication with said air intake and the other end of said casing being open to define a discharge opening, a fan disposed in said second casing for moving air through said air intake and out the discharge opening, a rotatable hub disposed adjacent said one end of said second casing within said first casing, said hub having a plurality of orifices therein, means for supplying water to said hub, at least one ring disposed about said hub against which water issuing from said orifices impinges to form a spray of finely divided water particles in the air stream entering the second casing, and eliminator means on said hub for removing water particles entrained in the air stream prior to discharge from the second casing, said eliminator means comprising a plurality of blades having portions thereof overlapping so as to define a plurality of axial paths having at least one change in direction.

5. An apparatus as in claim 4 wherein the portion of the second casing adjacent said one end is conical.

6. In an eliminator for removing droplets of water from an air stream, a rotatably mounted hub, a plurality of blades extending therefrom, each of said blades having a first planar portion extending substantially from the axis of rotation and having a desired surface area exposed to the air stream and a second planar portion extending substantially from the axis of rotation and having a surface area substantially similar to the surface area of the first portion exposed to the air stream, said portions intersecting in a line drawn substantially radially of the axis of rotation, said portions being angularly disposed with respect to each other and intersecting in a line drawn radially from said hub, said blades being in overlapping relationship so as to define a plurality of axial paths, each having at least one change in direction and means secured to the extremities of the blades for at least partially enclosing the periphery of said blades, said means comprising tabs on the end of each blade.

7. An eliminator as in claim 6 wherein the enclosing means includes rings disposed about the periphery of the blades on each side of said blades and the tabs are secured to the end of each blade at an angle relative thereto.

8. An eliminator as in claim 6 wherein the enclosing means includes a ring concentrically disposed about the periphery of the blades on each side of said blades and said tabs are planar protuberances secured to the end of each blade.

References Cited in the file of this patent

UNITED STATES PATENTS

| 233,171 | Swan | Oct. 12, 1880 |
| 1,190,386 | Dickerson | July 11, 1916 |
| 1,480,775 | Marien | Jan. 15, 1924 |
| 1,511,834 | Marien | Oct. 14, 1924 |

FOREIGN PATENTS

| 340,715 | Germany | Sept. 16, 1921 |
| 128,963 | Austria | June 25, 1932 |